Patented June 28, 1949

2,474,729

UNITED STATES PATENT OFFICE 2,474,729

INSULIN PREPARATIONS

Pierre Durel and Paul Dubost, Paris, France, assignors to Societe des Usines Chimiques Rhone-Poulenc, Paris, France, a French body corporate No Drawing. Application January 2, 1946, Serial No. 638,712. In France January 3, 1945

12 Claims. (Cl. 167—75)

This invention is for improvements in or relating to insulin preparations and has for its object to provide insulin solutions having a more prolonged action than solutions hitherto known.

Insulin is customarily administered in the form of an aqueous solution by subcutaneous injection and, as is well known, one of the main disadvantages of this otherwise very valuable product is its too short duration of action, which frequently necessitates an excessive number of injections, with consequent discomfort to the patient. Various expedients have already been proposed for prolonging the effect of insulin; the best known consists in associating insulin with certain protamines such as clupeine and preferably in addition a small quantity of zinc. An example is the product known as protamine zinc insulin, also called "retarded action" insulin. Another expedient which is likewise utilised consists in the addition to insulin of certain complex ureas with, if desired, a small quantity of magnesium. It has also been proposed for the stated purpose to add to the insulin a synthetic colloidal compound of high molecular weight, such as polyvinyl alcohol; but in practice the mixtures thus obtained have not hitherto given complete satisfaction.

It has now been found that it is possible to obtain solutions of insulin having considerably increased action and above all a very greatly prolonged effect, even in comparison with the "retarded action" insulin preparations known hitherto, if the insulin is dissolved in a sufficiently concentrated aqueous solution of polyvinylpyrrolidone (10 to 20% for instance), with the further addition, if desired, of small quantities of metallic salts.

The present invention, therefore, comprises a method for the preparation of insulin solutions having prolonged action and suitable for use by subcutaneous injection which comprises dissolving insulin in a sufficiently concentrated aqueous solution of polyvinylpyrrolidone. The invention also includes the insulin solutions so obtained, which may contain, if desired, small quantities of metallic salts.

The prolonged effect of the insulin preparations of the present invention naturally depends upon the concentration of polyvinylpyrrolidone. While it is a simple matter to determine by preliminary trial, the concentration desired in any particular case viz. to produce a given prolongation of effect it is in general necessary to employ a concentration of at least 10% by weight and, in most cases, concentrations lying between 10% and 20% of polyvinylpyrrolidone having a molecular weight between 30,000 and 40,000 are employed.

The invention is illustrated by the following non-limitative example.

Example 60 cc. of a medicinal solution of insulin of 20 units to the cc. are dried (for example by evaporation under vacuum in the cold). The residue is dissolved in a mixture of 4.8 cc. of decinormal hydrochloric acid and 1.2 cc. of water. The mixture is made up to 60 cc. with a solution having the following composition:

| | |
|---|---:|
| Polyvinylpyrrolidone (of a molecular weight between 30,000 to 40,000) gr__ | 200 |
| Sodium chloride _____ gr__ | 8 |
| Potassium chloride _____ | 0.420 |
| Chloride of calcium with 6 molecules of water _____ | 0.500 |
| Chloride of magnesium with 6 molecules of water _____ | 0.005 |
| Normal hydrochloric acid _____cc__ | 17.1 |
| Sodium bicarbonate _____gr__ | 1.680 |
| Distilled water _____cc__ | 1000 |

It can be proved experimentally that, for a given dose of insulin, the hypoglycemic action of such solutions is substantially as rapid as that of an aqueous solution but is at the same time more marked and much more prolonged. Thus, in experiments on the rabbit, the action of a dose of insulin dissolved in 0.5 cc. of plain water caused the glycemia to fall after one hour to 69% of the initial value and, after two hours, to 68%. After three hours, the glycemia had already risen again to 80% of the initial value while the initial value itself was reached again in about six hours. After injection of the same dose of the same insulin, but this time dissolved in an equal quantity of a 20% aqueous solution of polyvinylpyrrolidone, the glycemia fell at the end of an hour to 66% of the initial value, at the end of two hours to 58%, and after three hours to 54%, whereafter the glycemia value rose again but slowly. After seven hours, the glycemia value was still only 78% of the initial value.

There is thus no doubt that the use of insulin solutions comprising an addition of polyvinylpyrrolidone as above described makes it possible to obtain the same physiological effect with a dose of insulin considerably smaller than that necessary in aqueous solution, which permits a substantial economy of the active product and at the same time an interval between successive

We claim:

1. Method for the preparation of an insulin solution having a prolonged action and suitable for use by injection which comprises dissolving insulin in a concentrated aqueous solution of polyvinylpyrrolidone.

2. Method for the preparation of an insulin solution having a prolonged action and suitable for use by injection which comprises dissolving insulin in a concentrated aqueous solution of polyvinylpyrrolidone containing small quantities of metal salts.

3. Method for the preparation of an insulin solution having a prolonged action and suitable for use by injection which comprises dissolving insulin in an aqueous solution containing a quantity of polyvinylpyrrolidone effective to retard the physiological effect of the insulin content on administration.

4. Method for the preparation of an insulin solution having a prolonged action and suitable for use by injection which comprises dissolving insulin in an aqueous solution containing at least 10% by weight of polyvinylpyrrolidone.

5. Method for the preparation of an insulin solution having a prolonged action and suitable for use by injection which comprises dissolving insulin in an aqueous solution containing at least 10% by weight of polyvinylpyrrolidone having a molecular weight lying between 30,000 and 40,000.

6. An aqueous insulin solution prepared for use by subcutaneous injection which contains a quantity of polyvinylpyrrolidone effective to retard the physiological effect of the insulin content on administration.

7. An aqueous insulin solution prepared for use by subcutaneous injection which contains at least 10% by weight of polyvinylpyrrolidone.

8. An aqueous insulin solution prepared for use by subcutaneous injection which contains a quantity of polyvinylpyrrolidone of a molecular weight lying between 30,000 and 40,000 effective to retard the physiological effect of the insulin content on administration.

9. An aqueous insulin solution prepared for use by subcutaneous injection which contains at least 10% by weight of polyvinylpyrrolidone having a molecular weight lying between 30,000 and 40,000.

10. An aqueous insulin solution prepared for use by subcutaneous injection which contains between 10% and 20% by weight of polyvinylpyrrolidone.

11. An aqueous insulin solution prepared for use by subcutaneous injection which contains between 10% and 20% by weight of polyvinylpyrrolidone having a molecular weight lying between 30,000 and 40,000.

12. An aqueous insulin solution intended to be administered by subcutaneous injection which has been prepared by dissolving in a mixture of about 4.8 ccs. of decinormal hydrochloric acid and about 1.2 ccs. of water the residue resulting from the evaporation of 60 ccs. of a medicinal solution of insulin containing 20 units per cc., and making the resulting mixture up to 60 ccs. with a solution having the following composition:

| | |
|---|---|
| Polyvinylpyrrolidone (of a molecular weight between 30,000 to 40,00) gr__ | 200 |
| Sodium chloride _____gr__ | 8 |
| Potassium chloride _____ | 0.420 |
| Chloride of calcium with 6 molecules of water _____ | 0.500 |
| Chloride of magnesium with 6 molecules of water _____ | 0.005 |
| Normal hydrochloric acid _____cc__ | 17.1 |
| Sodium bicarbonate _____gr__ | 1.680 |
| Distilled water _____cc__ | 1000 |

PIERRE DUREL.
PAUL DUBOST.

REFERENCES CITED

The following references are of record in the file of this patent:

UNITED STATES PATENTS

| Number | Name | Date |
|---|---|---|
| 2,050,558 | Bockmühl | Aug. 11, 1936 |
| 2,076,082 | Hagedorn | Apr. 6, 1937 |
| 2,294,016 | Brahn | Aug. 25, 1942 |
| 2,354,211 | Lang | July 25, 1944 |

FOREIGN PATENTS

| Number | Country | Date |
|---|---|---|
| 209,240 | Switzerland | June 17, 1940 |

OTHER REFERENCES

Howarth: "Blood substitutes for transfusion purposes," in Mfg. Chemist, July 1945.

Arch. für Klin. Chirurgie, 1943, vol. 205, pages 230–282.